April 22, 1952    J. V. HONEYCUTT ET AL    2,593,453
COUPLING PIN
Filed April 20, 1949    2 SHEETS—SHEET 1
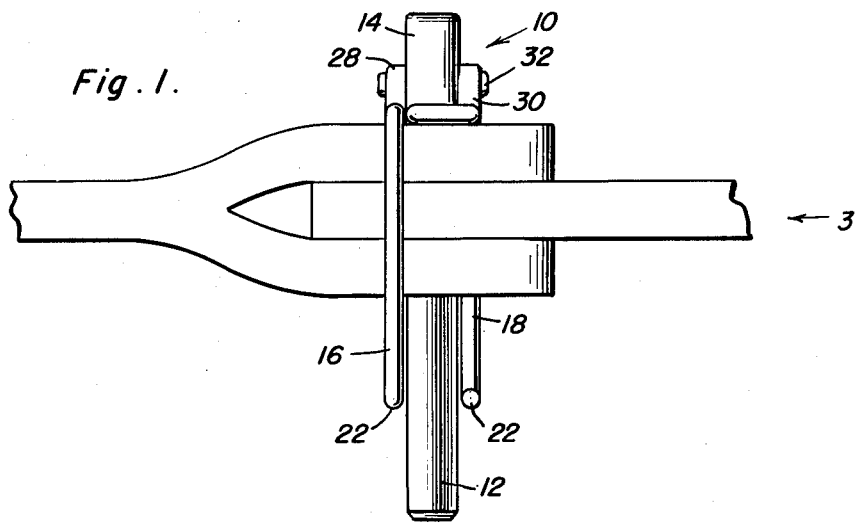
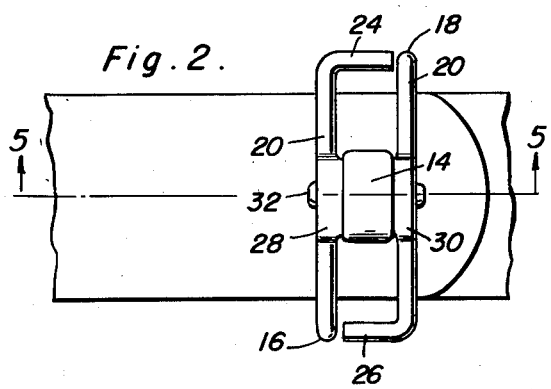
Inventors
James V. Honeycutt
John Platis
Joseph A. Marchand
By
Attorneys April 22, 1952  J. V. HONEYCUTT ET AL  2,593,453
COUPLING PIN Filed April 20, 1949  2 SHEETS—SHEET 2

Inventors
James V. Honeycutt
John Platis
Joseph A. Marchand

By Clarence A. O'Brien
and Harvey B. Jackson
Attorneys

Patented Apr. 22, 1952

2,593,453

UNITED STATES PATENT OFFICE 2,593,453

COUPLING PIN

James V. Honeycutt, John Platis, and Joseph A. Marchand, Corpus Christi, Tex.

Application April 20, 1949, Serial No. 88,569

2 Claims. (Cl. 280—33.15)

This invention relates to new and useful improvements in coupling pins and the primary object of the present invention is to provide a small and compact coupling pin so constructed as to permit the same to be used to couple any type of coupling using tongue and fork, socket and tongue, as clevis pin, such as mine car work, horse work, series car links, tractor to trailer, adjustable pipe booms, and most any place where safe and rapid coupling and uncoupling is done by aid of coupling pins.

Another important object of the present invention is to provide a coupling pin including a shank having a pair of arms pivoted thereto, said arms being urged, by their own weight, to a position for completely embracing a hitch fork and tongue.

A further object of the present invention is to provide a coupling pin that is quickly and readily applied to or removed from a hitch fork and tongue in a convenient and safe manner.

A still further aim of the present invention is to provide a coupling pin that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompany drawings forming part hereof, wherein like numerals refer to like parts throughout, and in which:

Figure 1 is a side elevational view of a pair of coupling members and showing the present coupling pin applied to the coupling members;

Figure 2 is a top plan view of Figure 1;

Figure 3:
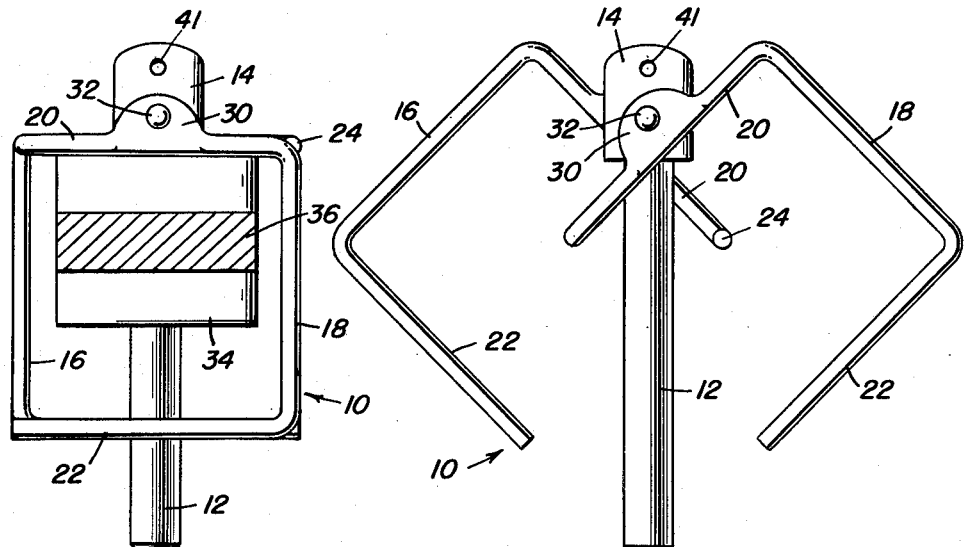
Figure 3 is an end view taken substantially in the direction of arrow numbered 3 in Figure 1.

Referring now to the drawings in detail, wherein, for the purpose of illustration, there is disclosed a preferred embodiment of the present invention, the numeral 10 represents the present coupling pin generally, including a cylindrical shank portion 12 having an enlarged end portion or head 14.

A pair of substantially U-shaped latch or wire frame members 16 and 18 are associated with the shank portion 12. The members 16 and 18 each includes upper and lower leg portions 20 and 22 and lateral projections 24 and 26 are provided on the upper leg portions of the said latch members.

The upper leg portions 20 of the latch members or arms 16 and 18 are formed with flattened central portions 28 and 30, respectively. The central portions 28 and 30 bear against opposite sides of the head 14 and are pivotally secured together and to the head 14 by a rivet or pin 32 having its ends flattened.

The latch members 16 and 18 are spaced parallel to each other and are so arranged as to define an element that will completely embrace a tongue and fork connection or such other connection between two structural elements.

The numeral 34 represents a fork member or first coupling member that is applied to one vehicle and which receives a tongue or second coupling member 36 applied to a further vehicle. The furcations of the fork member 34 are provide with openings 38 that register with another opening 40 provided in the tongue 36.

Figure 4:
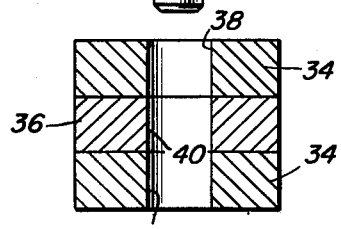
Figure 4 is an end view showing the manner in which the present coupling pin is applied to a pair of coupling members; and, Figure 5 is a longitudinal vertical sectional view taken substantially on the plane of section line 5—5 of Figure 2.
Figure 5:
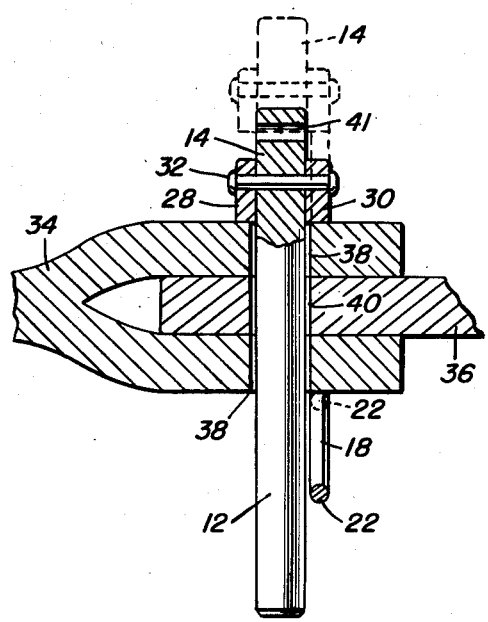

In practical use of the present invention, the latch members 16 and 18 are swung outwardly in opposite directions so that the same will be spread relative to each other as shown in Figure 4. Next, the shank portion 12 is slipped downwardly through the openings 38 and 40 and the latch members 16 and 18 release, whereupon the latch members, due to their own weight, will swing downwardly to embrace the fork 34 and tongue 36.

The upper leg portions 20 or the lateral projections 24 and 26, of the latch members or arms, bear upon the upper face of the fork 34 and will tend to restrict any pivotal movement of the latch members when the instant structure is in its coupled position.

In order to release the present coupling pin from its coupled position, as shown in Figures 1, 2, 3 and 5, it is necessary to raise the shank portion 12 and simultaneously swing the latch members 16 and 18 outwardly, as illustrated in Figure 4, so that the said latch members will clear the coupling members 34 and 36.

It should be noted that the head 14 is provided with an aperture 41 that will receive a chain or flexible element whereby the instant coupling pin can be secured to one of the coupling members to prevent loss of the said coupling pin and so that the same may be held conveniently close to one of the coupling members.

The objectives of the instant invention are accomplished by a gravity-actuated safety arm hitch coupling pin, where the force of gravity tends to keep the safety arms or latch members encircled about the hitch fork and tongue, and it is therefore necessary to raise both of the latch members simultaneously before the coupling pin can be removed.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a tongue and fork connection, a coupling pin, said coupling pin comprising a shank insertable through said tongue and fork, said shank having a head portion bearing upon said fork, and first and second U-shaped latch members having upper and lower leg portions, the upper leg portions of said members being pivoted intermediate their ends to opposite sides of said head portion and resting upon the fork, said upper leg portions having lateral projections bearing upon said fork, said latch members cooperating with each other to completely embrace said tongue and fork connection.

2. A coupling comprising a shank having a flat head portion, first and second U-shaped wire frame latch members each having upper and lower leg portions and a web portion joining said upper and lower leg portions, ears rising from the upper leg portions of said members and intermediate the ends of said upper leg portions and contacting opposite faces of said flattened head, and a pivot extending through said ears and said head portion, the web portion of said first latch member being disposed remotely from the web portion of said second latch member to confine a structural element between the leg portions and web portions of both latch members.

JAMES V. HONEYCUTT.
JOHN PLATIS.
JOSEPH A. MARCHAND.

REFERENCES CITED

The following references are of record in the file of this patent:

UNITED STATES PATENTS

| Number | Name | Date |
|---|---|---|
| 2,077,825 | Davidson | Apr. 20, 1937 |
| 2,118,231 | Ricker | May 24, 1938 |
| 2,180,558 | Stastny | Nov. 21, 1939 |
| 2,224,522 | Peterson | Dec. 10, 1940 |
| 2,367,874 | Kelley | Jan. 23, 1945 |
| 2,436,210 | Fuhrer | Feb. 17, 1948 |
| 2,454,856 | Bible | Nov. 30, 1948 |